（12）United States Patent
Fujiwara et al.

(10) Patent No.: US 7,302,862 B2
(45) Date of Patent: Dec. 4, 2007

(54) FLOW RATE-MEASURING DEVICE

(75) Inventors: Toshimitsu Fujiwara, Kusatsu (JP); Satoshi Nozoe, Toyonaka (JP); Hidenari Kuribayashi, Fuchu (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/551,669

(22) PCT Filed: Mar. 22, 2004

(86) PCT No.: PCT/JP2004/003825

§ 371 (c)(1),
(2), (4) Date: Jul. 14, 2006

(87) PCT Pub. No.: WO2004/090476

PCT Pub. Date: Oct. 21, 2004

(65) Prior Publication Data

US 2007/0017303 A1    Jan. 25, 2007

(30) Foreign Application Priority Data

Apr. 4, 2003    (JP) .............................. 2003-101742

(51) Int. Cl.
*G01F 1/37* (2006.01)
(52) U.S. Cl. .................................... 73/861.52
(58) Field of Classification Search .............. 73/202.5, 73/204.21, 761.52, 861.61
See application file for complete search history.

(56) References Cited

U.S. PATENT DOCUMENTS

| 4,280,360 A | | 7/1981 | Kobayashi et al. | |
|---|---|---|---|---|
| 4,376,929 A | * | 3/1983 | Myhre | 338/4 |
| 5,303,584 A | * | 4/1994 | Ogasawara et al. | 73/204.21 |
| 6,199,434 B1 | | 3/2001 | Cornil et al. | |
| 6,401,531 B1 | | 6/2002 | Tank et al. | |
| 6,645,274 B2 | | 11/2003 | Rilling et al. | |
| 6,647,775 B1 | * | 11/2003 | Hecht et al. | 73/202.5 |
| 6,652,740 B2 | * | 11/2003 | Schoess | 210/90 |
| 6,655,207 B1 | * | 12/2003 | Speldrich et al. | 73/202.5 |

FOREIGN PATENT DOCUMENTS

| CN | 1272176 A | 11/2000 |
|---|---|---|
| CN | 2410456 Y | 12/2000 |
| CN | 1380970 A | 11/2002 |
| JP | 6-43907 | 6/1994 |
| JP | 11-132818 | 5/1999 |
| JP | 11-183212 | 7/1999 |

(Continued)

OTHER PUBLICATIONS

English translation of the International Preliminary Report on Patentability directed to PCT/JP2004/003825.

(Continued)

*Primary Examiner*—Jewel Thompson
(74) *Attorney, Agent, or Firm*—Morrison & Foerster LLP.

(57) ABSTRACT

A flow sensor 22 is provided on a wall surface of a flow path 4 in which a fluid to be measured. A member having minimal cross-section flow path 17 which has a diameter extremely smaller than that of the flow path 4 where the flow sensor 22 is provided is disposed at the downstream of the flow sensor 22.

16 Claims, 12 Drawing Sheets

FOREIGN PATENT DOCUMENTS

| | | |
|---|---|---|
| JP | 11-325998 | 11/1999 |
| JP | 2000-146652 | 5/2000 |
| WO | WO 01/63220 A2 | 8/2001 |

OTHER PUBLICATIONS

Partial Translation of Korean Office Action dated Jan. 15, 2007, directed at counterpart KR application No. 10-2005-7018302.

English translation of the International Preliminary Report on Patentability directed to PCT/JP2004/003825.

Chinese Office Action mailed on Feb. 2, 2007 for Chinese Application No. 200480008763.5. 7 pages.

European Search Report mailed on Apr. 4, 2007 for European Patent Application No. 04722414.2. 3 pages.

* cited by examiner

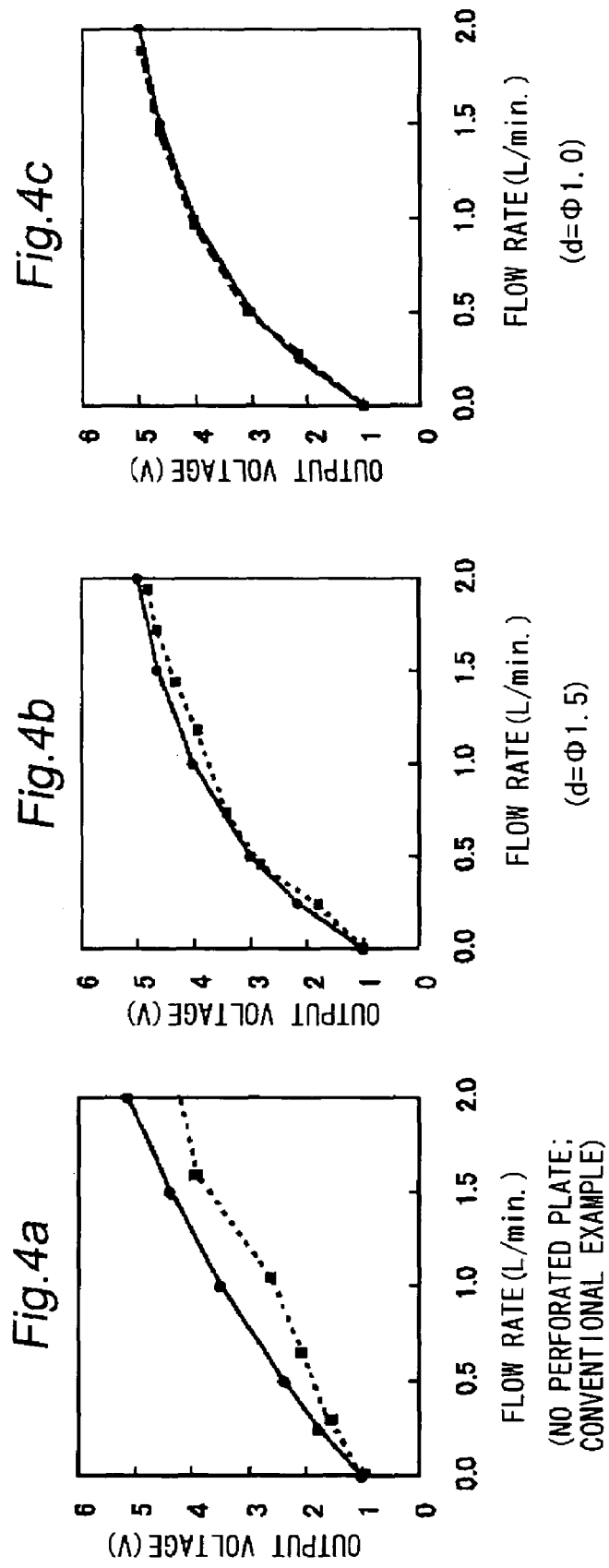

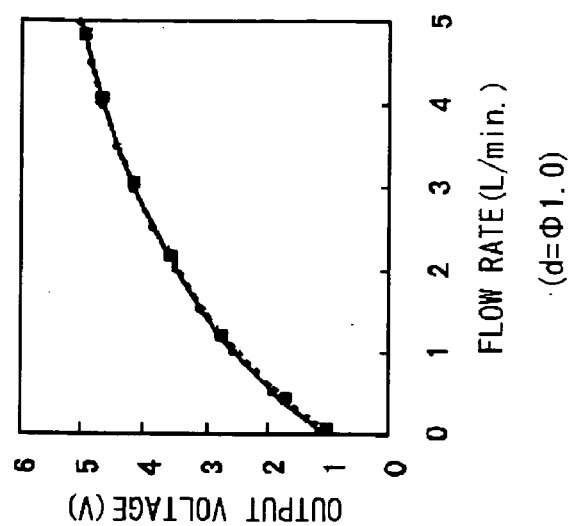
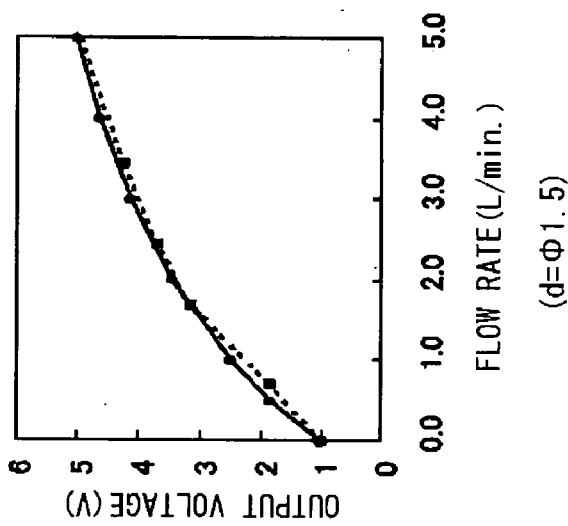
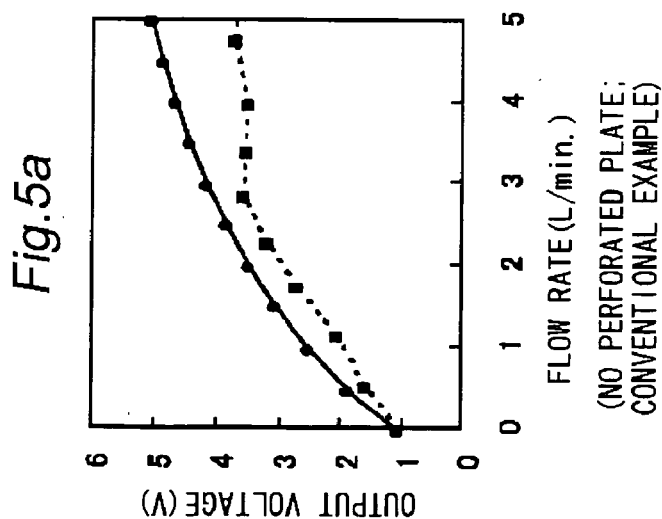

FLOW RATE-MEASURING DEVICE

TECHNICAL FIELD

The present invention relates to a flow measurement device for measuring flow rate of fluid flowing in a flow path.

BACKGROUND ART

In a conventional flow measurement device, a flow sensor is attached on the upper part of the wall surface of a flow path formed in a body. On the upstream side of the flow sensor, a plurality of straightening meshes is disposed via spacers at constant intervals. On the downstream side of the flow sensor, a mesh is also disposed. The flow sensor is disposed so that the detector plane of the flow sensor faces the flow path. The flow sensor calculates a flow rate based on a voltage corresponding to a flow velocity of the fluid to be measured and outputs it.

It is ideal that the fluid flowing in the flow path of the flow measurement device presents a uniform flow (steady flow) in which direction and magnitude of flow are same at any positions in the cross section of the flow path. However, the real fluid does not always present such a steady flow and has different direction and magnitude of flow at each position of the cross section of the flow path, causing drift or involving vortex (unsteady flow). This is caused by a wide variety of factors, for example, bend of piping connected to the upstream side and down stream side of the flow measurement device, pulsation and deviated velocity distribution due to a discharged condition of a pump, viscosity and density of the fluid and so on.

In order to reduce disturbance of the fluid, it is proposed in Japanese publication of examined application No. H6-43907 to provide a reduced portion in a flow path backward of a straightening metal mesh. The flow measurement device provided with such reduced section will be explained hereinafter in accordance with a schematic view of FIG. 22. On the upstream side of a flow path 101, a plurality of straightening meshes 103 is disposed via spacers 102. Backward of the meshes 103, a reduced portion 105 is formed toward a flow path 101 in which a flow sensor 104 is provided. On the down stream side of the flow sensor 104 is formed an expanded portion 106. In the expanded portion a mesh 107 is disposed.

However, even in the flow measurement of the above patent document in which the plurality of straightening meshes 103 and the reduced portion 105 are provided, their functions are not sufficiently performed and the flow is not perfectly straightened. For example, when a fluid with a disturbed flow distribution which is caused by, for example, a bend shown by an arrow 107 existing in a piping connected to the upstream side of the flow measurement device enters the device, the disturbance could not be suppressed by the straightening meshes 103 and the reduced portion 105. Thus, the disturbance has been continued to the downstream side so that at the position of the flow sensor 104 the flow in the upper portion of the flow path has become slower and the flow in the lower portion has become faster. As a result, the flow sensor 104 has output a smaller flow rate than a mean flow rate.

DISCLOSURE OF INVENTION

In view of the problems above, it is an object of the present invention to provide a flow measurement device which is able to suppress the turbulence of the flow rate in the cross section of the flow path and conduct high accurate and reliable flow measurement.

A flow measurement device according to the present invention, comprising: a flow path in which a fluid to be measured; a flow sensor provided on a wall surface of the flow path; and a member having minimal cross-section flow path, the member being disposed at the downstream of the flow sensor.

The minimal cross-section flow path means a flow path having a diameter extremely smaller than that of the main flow path portion. For example, the member having minimal cross-section flow path may be a perforated plate having an aperture as the minimal cross-section flow path.

A mesh may be disposed at the upstream side of the member having minimal cross-section flow path.

According to the present invention, since the flow sensor is provided on the wall of the flow path in which the fluid to be measured and the member having minimal cross-section flow path is provided at the downstream side of the flow sensor, there is a advantage that it is possible to suppress the turbulence of the flow rate in the cross section of the flow path and conduct high accurate and reliable flow measurement.

BRIEF DESCRIPTION OF DRAWINGS

FIGS. 4a, 4b and 4c are graphs of changes in output voltage to flow rate showing results of first experiment for confirming effects of the present invention;

FIGS. 5a, 5b and 5c are graphs of changes in output voltage to flow rate showing results of second experiment for confirming effects of the present invention;

FIG. 20 is a side view showing other embodiment of a member having minimal cross-section flow path;

FIG. 21 is a side view showing other embodiment of a member having minimal cross-section flow path.

BEST MODE FOR CARRYING OUT THE INVENTION

Embodiments of the present invention will be described hereinafter with reference to the accompanying drawings.

Figure 1:
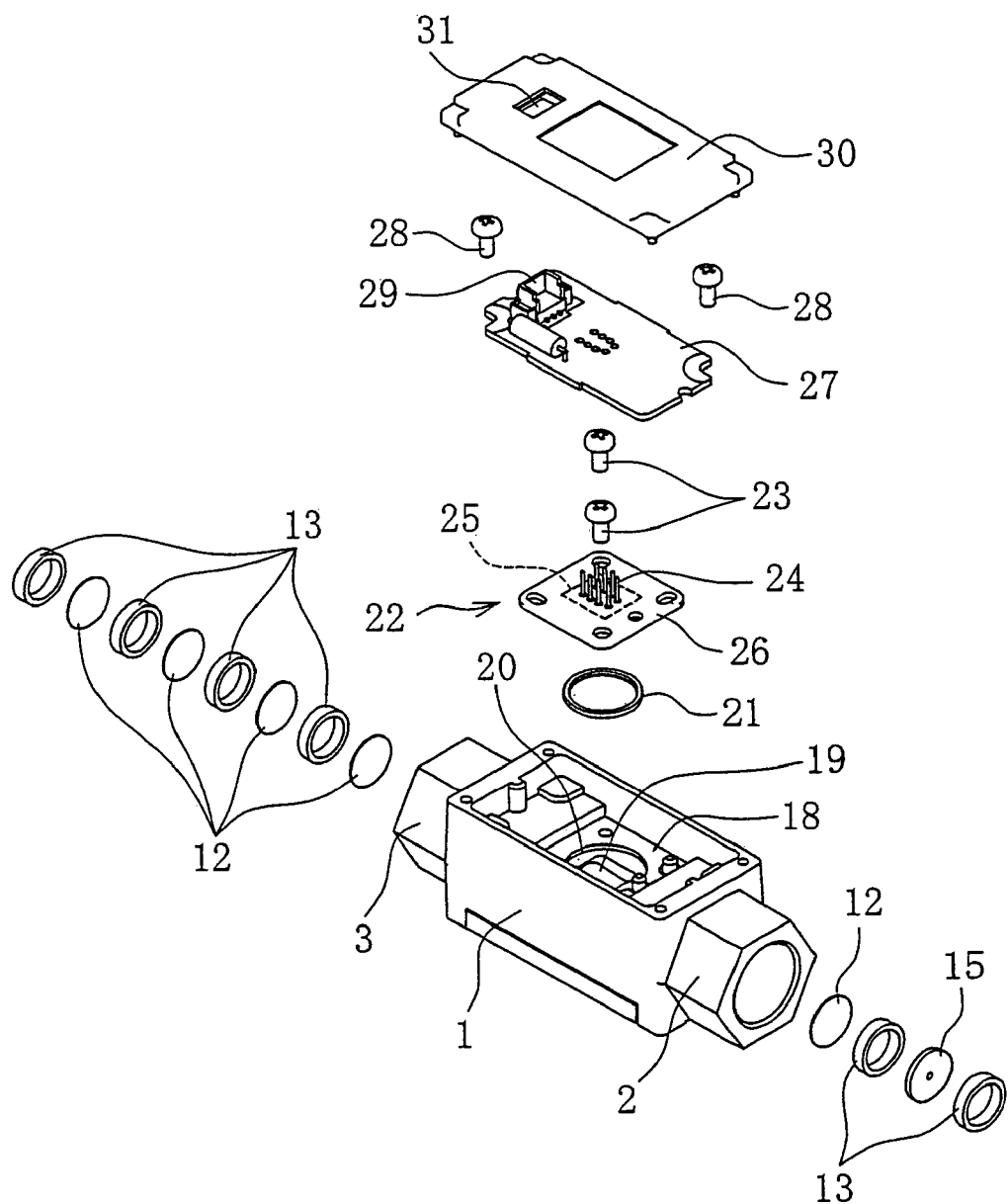
FIG. 1 is a perspective view of a flow measurement device according to the present invention.
Figure 2:
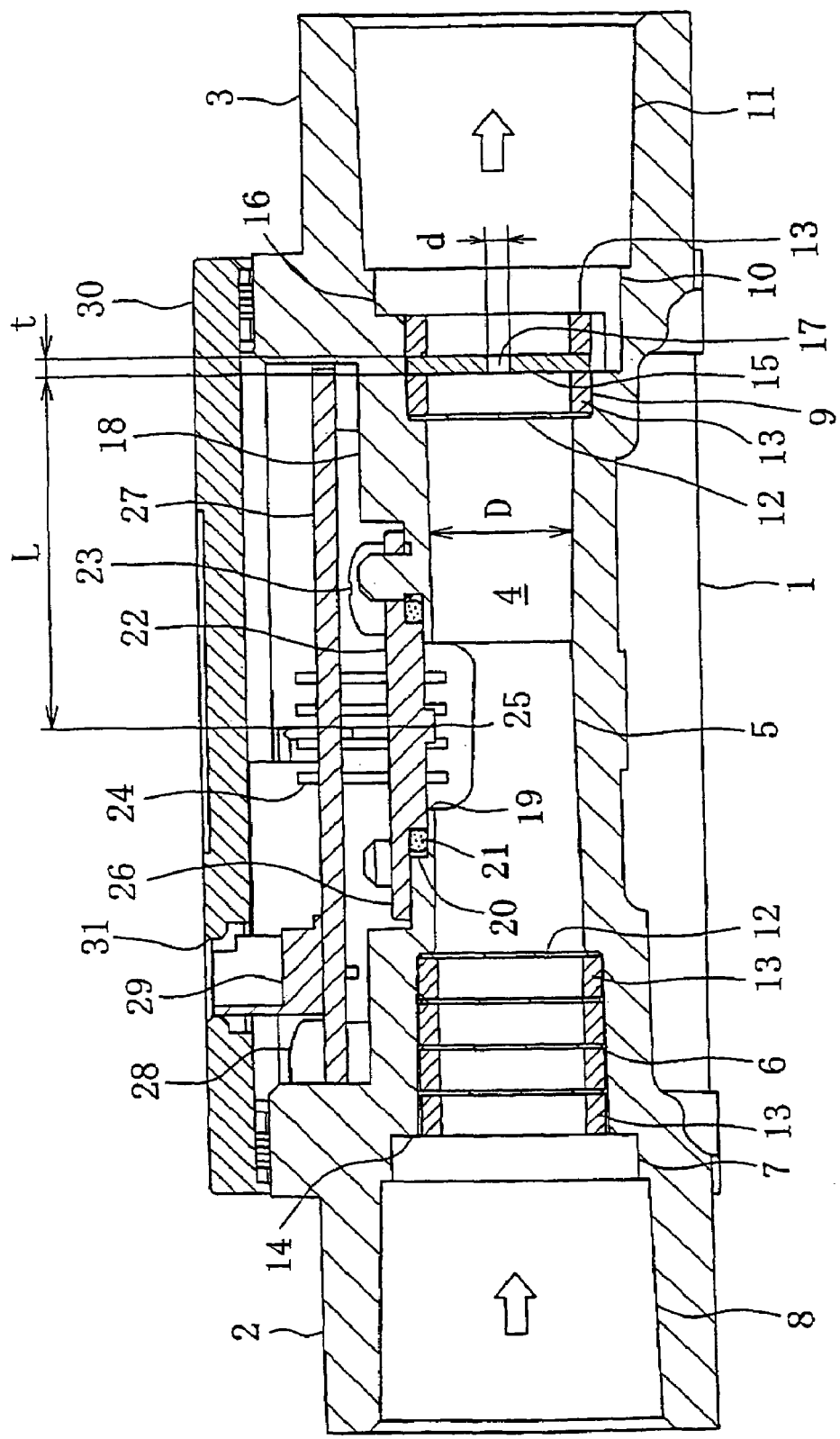
FIG. 2 is a sectional view of the flow measurement device of FIG. 2.

FIG. 1 is an exploded perspective view of the flow measurement device according to the present invention and FIG. 2 is a sectional view thereof. A base 1 has a parallelepiped and made of resin or metal or so. On the both ends, connecting portions 2, 3 in the form of hexagonal nut are integrally formed to protrude from the both ends. Inside the base 1, a flow path 4 passing through in a longitudinal direction is formed. The cross section of the flow path is circular in the present embodiment but should not be limited to this and any shape such as rectangular or so can be adopted.

The flow path 4 of the base 1 is formed with a main flow path portion 5 positioned centrally. On the upstream side of the main flow path 5, a straightening portion 6 having a larger diameter than the main flow path 5, a caulking portion 7 having a larger diameter than the straightening portion 6, and an inlet opening portion 8 having larger diameter than the caulking portion 7 are formed. Also, on the downstream side of the main flow path 5, a straightening portion 9 having a larger diameter than the main flow path 5, a caulking portion 10 having a larger diameter than the straightening portion 9, and an outlet opening portion 11 having larger diameter than the caulking portion 10 are formed.

In the straightening portion 6 on the upstream side, 4 sets of straightening pieces 12 having mesh-like shape and spacers 13 having ring-like shape are housed. The end face of the spacer 13 positioned at the most upstream side is flush with the end face 14 of the boundary between the straightening portion 6 and the caulking portion 7. Pressing the end face 14 allows the part of the end face 14 to be deformed so that the spacer 13 is fixed. In the straightening portion 9 on the downstream side, a straightening piece 12 having mesh-like shape and a spacer 13 having ring-like shape are housed. On the downstream side of the spacer 13, a member 15 having minimal cross-section flow path smaller than that of the main flow path portion 5 and a spacer 13 having ring-like shape are housed.

The member 15 having minimal cross-section flow path comprises a plate formed centrally with a circular aperture 17 having a diameter extremely smaller than that of the main flow path portion 5 (hereinafter, the member having minimal cross-section flow path is referred to as perforated plate 15). The perforated plate 15 is a separate body from the base 1 but may be integral with the base 1. The fixation of the spacer 13 is not limited to the caulking but any fixation structure such as fixation by adhesive, screw cramp using another member or so can be adopted. The inner diameter of each spacer 13 is same as the main flow path portion 5. Therefore, the flow path of the base 1 has same diameter from the caulking portion 7 on the upstream side to the caulking portion 10 on the down stream side except the perforated plate 16.

On the outer surface of the base 1 are formed a depressed portion 18 and a window 19 on the bottom of the depressed portion 18. Around the window 19 is formed a circular step portion 20. In the depressed portion 18, a flow sensor 22 is attached via an O-ring 21 by means of screws 23. The O-ring 21 prevents the fluid that flows in the main flow path portion 5 from leaking outside the flow sensor 22. The flow sensor 22 comprises a support plate 26 on which a sensor chip 25 having leads 24 is mounted so that a detector plane of the sensor chip 25 faces the main flow path portion 5 through the window 19. Above the flow sensor 22, a substrate 27 is attached by means of screws 28. The leads 24 of the flow sensor 22 pierce the substrate 27 and are electrically connected to a circuit on the substrate 27 by means of solder or so. A connector 29 is attached on the substrate 27 so that a signal can be outputted to the external. Above the substrate 27, a cover 30 is attached on the base 1. In the cover 30 is formed a hole 31 through which the connector 29 is exposed.

Operation of the flow measurement device having above construction will be described hereinafter.

In FIG. 2, the gas entered into the inlet opening portion 8 of the base 1 passes through four straightening pieces 12 having mesh-like shape on the upstream side to be straightened and flows in the main flow path portion 5. Then, the gas passes through the straightening piece 12 having mesh-like shape on the upstream side and the perforated plate 15 and exits from the outlet opening portion 11 of the base 1. The velocity of the gas flowing in the main flow path portion 5 is detected by the flow sensor 22. A detected signal of the flow sensor 22 is output to the exterior via the connector 29 of the substrate 27.

Figure 3:
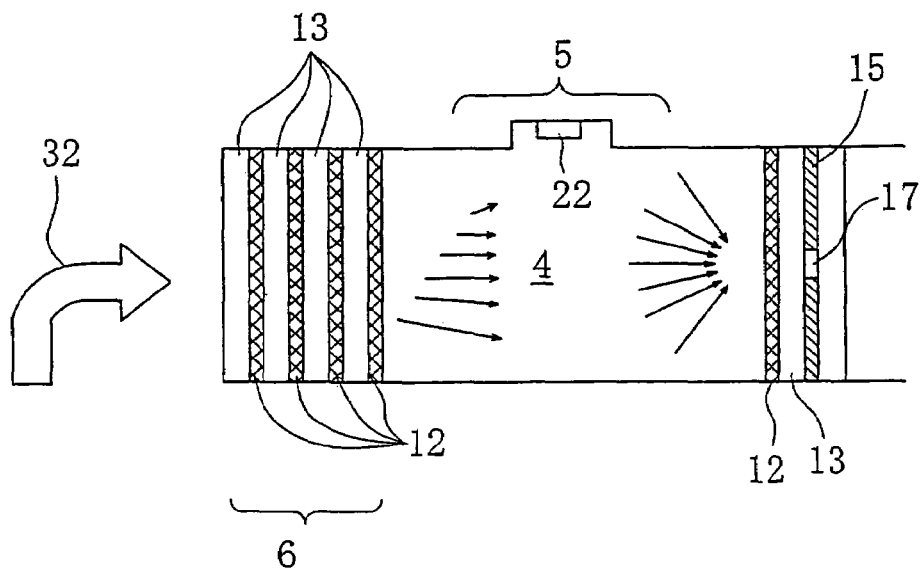
FIG. 3 is a schematic view of the flow path of the flow measurement device of FIG. 2.
Figure 22:
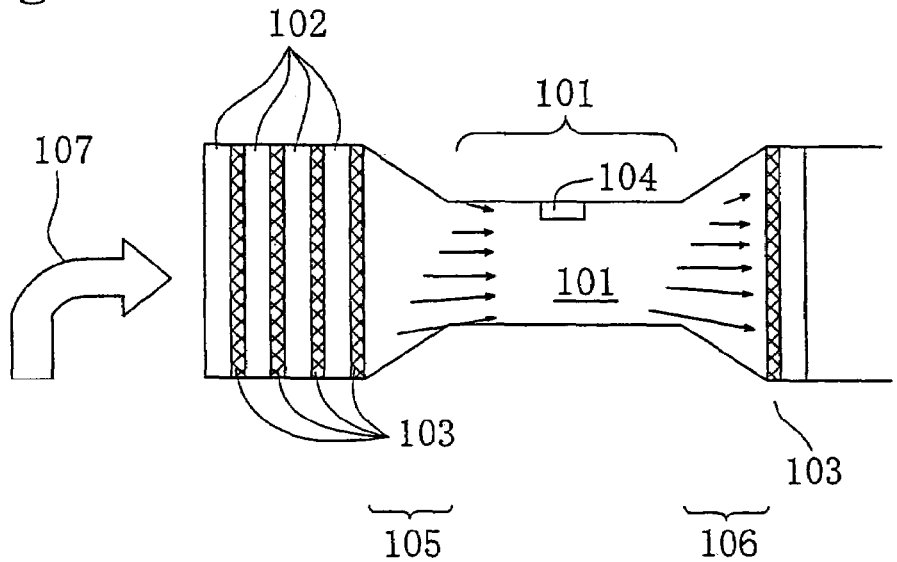
FIG. 22 is a schematic view of a flow path of a conventional flow measurement device.

If the flow of the gas entered in the inlet opening portion 8 of the base 1 is a steady flow, the current velocity at each position within the main flow path portion 5 is approximately uniform and the velocity detected by the flow sensor 22 shows substantially mean velocity. However, as shown in FIG. 3, in the case that the flow of the gas is an unsteady flow due to a factor that the piping connected to the flow measuring device has a bend 32 or so, the velocity distribution of the unsteady flow is straightened to some extent by passing through the four straightening pieces 12 but drift or turbulence is caused even in the main flow path portion 5. However, since there exist the perforated plate 15 of minimal cross-section flow path on the down stream side of the main flow path portion 5, the flow having drift or turbulence on the down stream side of the main flow path portion 5 is apt to flow toward the aperture 17 of the perforated plate 15, causing a rapid pressure drop. Thus, straightening is caused so as to withstand the rapid pressure drop. As a result, the velocity detected by the flow sensor 22 show substantially mean velocity. Thus, even in the unsteady flow, high accuracy and reliable measurement of the flow rate can be measured.

The inventors conducted various experiments in order to confirm the effects of the present invention. As an experiment facility, the flow measurement device of above construction was connected to a piping. In the piping, the gas in the steady flow and the unsteady flow was passed through the piping and the flow rate was measured. As a conventional example to be compared with the present invention, the flow measurement device of above construction in which the perforated plate 15 was removed was connected to the piping in the same manner. In the piping, the gas in the steady flow and the unsteady flow was passed through the piping and the flow rate was measured. Three kinds of the measurement devices in which the diameter D of the main flow path portion 5 was 4 mm, 6 mm, 10 mm respectively was used. The distance L from the center of the detector plane of the flow sensor 22 to the end face on the upstream side of the perforated plate 15 was 29.45 mm in the device having the diameter D of the main flow path portion 5 of 4 mm; 15.4 mm in the device having the diameter D of the main flow path portion 5 of 6 mm; and 15.4 mm in the device having the diameter D of the main flow path portion 5 of 10 mm. Four kinds of the perforated plate 15 made of aluminum and having a thickness of 0.8 mm in which the diameters d of the apertures were 1 mm, 1.5 mm, 2.5 mm, 3.5 mm were used. The flow rate was varied from 0 to 20 L/min.

<Experiment 1 (D=4 mm)>

In the conventional example having no perforated plate, as shown in FIG. 4a, the output voltage of the flow sensor in the case of unsteady flow shown in dotted line was measured at lower values than that in the case of steady flow shown in solid line. In the present invention, in the case of the perforated plate 15 of d=1.5 mm, as shown in FIG. 4b, the output voltage of the flow sensor in the case of unsteady flow shown in dotted line was measured at near values to that in the case of steady flow shown in solid line. In the case of the perforated plate 15 of d=1.0 mm, as shown in FIG. 4c, the output voltage of the flow sensor in the case of unsteady flow shown in dotted line was measured at substantially same values as that in the case of steady flow shown in solid line.

<Experiment 2 (D=6 mm)>

In the conventional example having no perforated plate, as shown in FIG. 5a, the output voltage of the flow sensor in the case of unsteady flow shown in dotted line was measured at lower values than that in the case of steady flow shown in solid line. In the present invention, in the case of the perforated plate 15 of d=1.5 mm, as shown in FIG. 5b, the output voltage of the flow sensor in the case of unsteady flow shown in dotted line was measured at extremely near values to that in the case of steady flow shown in solid line. In the case of the perforated plate 15 of d=1.0 mm, as shown in FIG. 5c, the output voltage of the flow sensor in the case of unsteady flow shown in dotted line was measured at substantially same values as that in the case of steady flow shown in solid line.

<Experiment 3 (D=10 mm)>

Figure 6C:
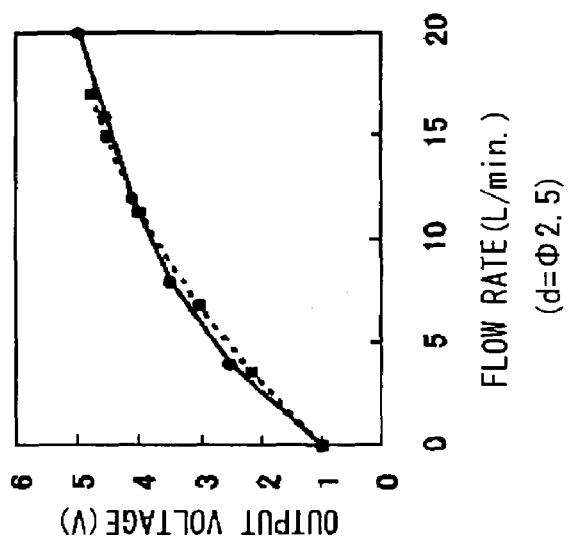
FIGS. 6a, 6b and 6c are graphs of changes in output voltage to flow rate showing results of third experiment for confirming effects of the present invention.
Figure 6B:
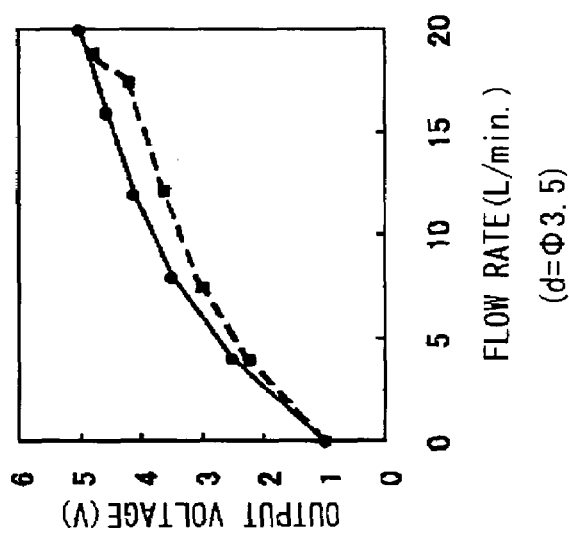
Figure 6A:
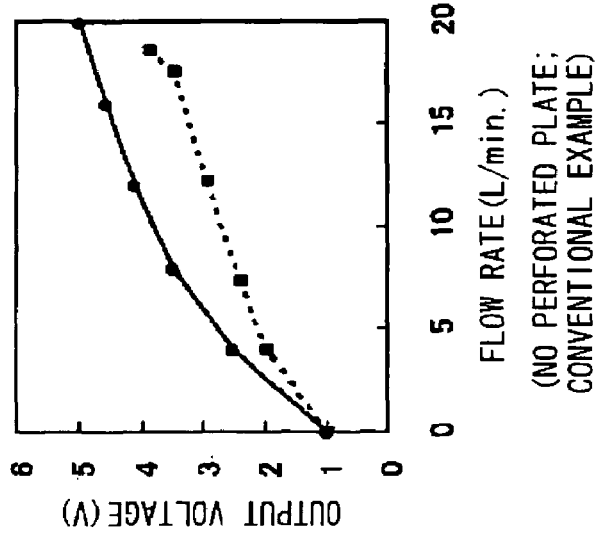

In the conventional example having no perforated plate, as shown in FIG. 6a, the output voltage of the flow sensor in the case of unsteady flow shown in dotted line was measured at lower values than that in the case of steady flow shown in solid line. In the present invention, in the case of the perforated plate 15 of d=3.5 mm, as shown in FIG. 6b, the output voltage of the flow sensor in the case of unsteady flow shown in dotted line was measured at slightly near values to that in the case of steady flow shown in solid line. In the case of the perforated plate 15 of d=2.5 mm, as shown in FIG. 6c, the output voltage of the flow sensor in the case of unsteady flow shown in dotted line was measured at extremely near values to that in the case of steady flow shown in solid line.

Organizing the results of the above experiments, as shown in Table below, it was found that in the flow measurement device of the present invention, if L/D is same, the smaller the opening ratio s/S of the perforated plate 15 is, the better the measurement results in the unsteady flow is. It was also found that if the opening ratio of the perforated plate 15 (s/S) is same, the larger L/D is, the better the measurement results in the unsteady flow is.

Result of the Experiment

|  | L (mm) | D (mm) | d (mm) | L/D | s/S (%) | Result |
|---|---|---|---|---|---|---|
| Experiment 1 | 29.45 | 4 | 1.0 | 7.36 | 6.25 | ◎ |
|  | 29.45 | 4 | 1.5 | 7.36 | 14.1 | ○ |
| Experiment 2 | 15.4 | 6 | 1.0 | 2.57 | 2.78 | ◎ |
|  | 15.4 | 6 | 1.5 | 2.57 | 6.25 | ○ |
| Experiment 3 | 15.4 | 10 | 2.5 | 1.54 | 6.25 | ○ |
|  | 15.4 | 10 | 3.5 | 1.54 | 12.25 | Δ |

The inventors also conducted experiments using the same experiment facility and in the same way as the above experiments in order to clarify the relation between the output voltage and the flow rate in a pulsation flow when varying the position L (distance from the center of the detector plane of the flow sensor 22 to the end face on the upstream side of the perforated plate 15), the shape of aperture 17, the thickness t of the perforated plate 15.

<Experiment 4>

Figure 7A:
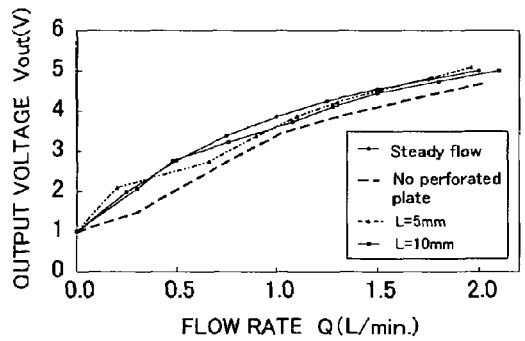
FIGS. 7a, 7b, 7c, 7d and 7e are graphs of changes in output voltage to flow rate showing results of fourth experiment for confirming effects of the present invention.
Figure 7B:
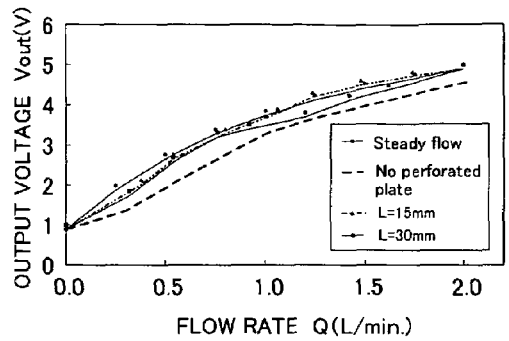
Figure 7C:
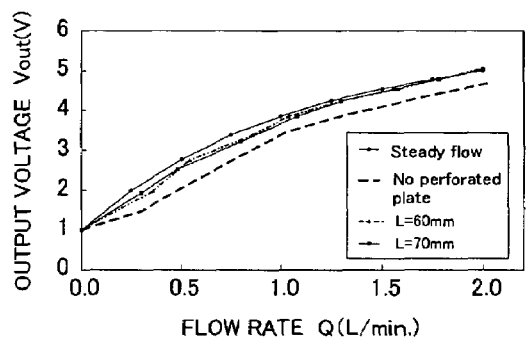
Figure 7D:
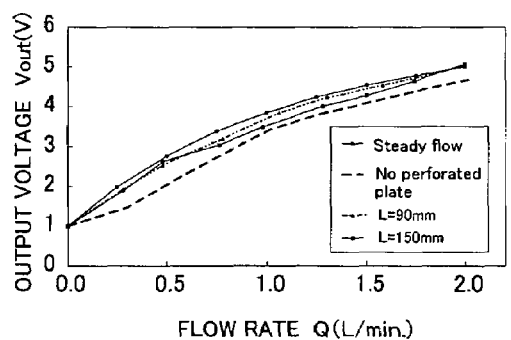
Figure 7E:
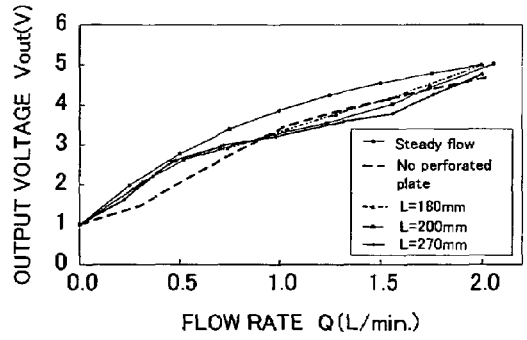

At first, in the experiment 4, using the perforated plate 15 having the thickness of 0.8 mm and the diameter d of the aperture of 1 mm, the flow rate and the output voltage were measured in the cases where the position L of the perforated plate 15 was varied from 5 mm to 270 mm. As shown in FIGS. 7a to 7d, in the case that the distance L of the perforated plate 15 is 5 mm, there were fluctuations of the output voltage in the area that the flow rate is 1 L/min and below, while in the case that the distance L of the perforated plate 15 is 150 mm and below, the output voltage of the flow sensor 22 is higher than that of the case having no perforated plate 15 as shown in a dotted line and were measured at near value to that in the case of steady flow shown in solid line, which shows the effect of reducing the influence of the pulsation. However, as shown in FIG. 7e, when the distance L of the perforated plate 15 exceeds 150 mm, the output voltage of the flow sensor 22 is lower than that of the case having no perforated plate 15 as shown in a dotted line in a flow area and were measured at value apart from that in the case of steady flow shown in solid line, which shows little effect of reducing the influence of the pulsation. According to this experiment 4, it was clarified that the effect of reducing the influence of the pulsation were found in the wide range of the position of the perforated plate 15 from the flow sensor 22 L=10 to 150 mm, i.e., L/D=2.8-37.5 and the measurement results in the unsteady flow was excellent; when the perforated plate 15 was too close to the flow sensor 22, fluctuations in measurement values was caused; and when the perforated plate 15 was too far, the effect of reducing the influence of the pulsation was lost.

<Experiment 5>

Figure 8A:
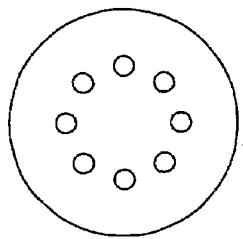
FIGS. 8a, 8b and 8c are front views of perforated plates used in a fifth experiment for confirming effects of the present invention.
Figure 8B:
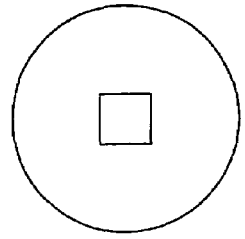
Figure 8C:
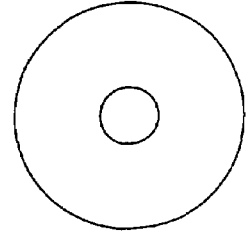
Figure 9:
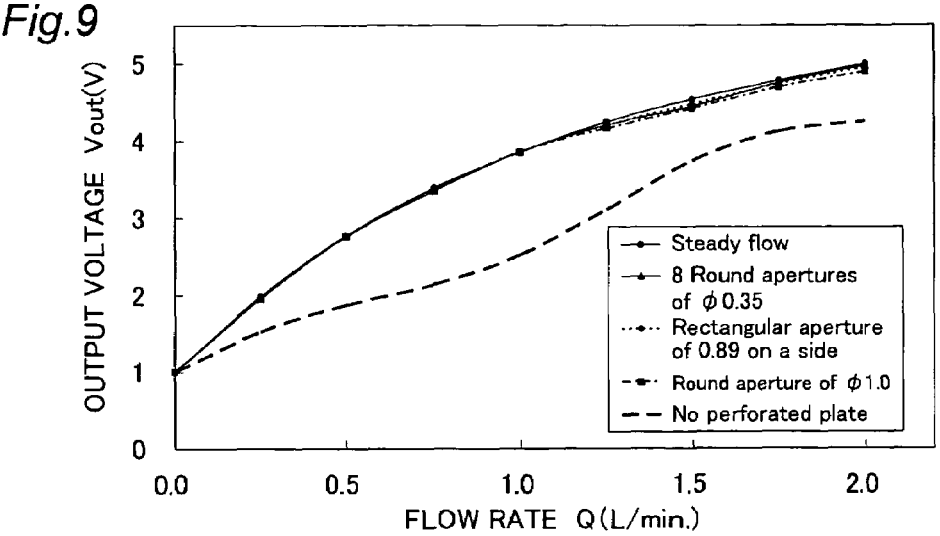
FIG. 9 is a graph of changes in output voltage to flow rate showing a result of fifth experiment.

In the experiment 5, in the case that three kinds of the perforated plates 15 which as shown in FIGS. 8a to 8c had same thickness (t=0.8) and total cross section area (corresponding to diameter of 1 mm) but had different shape of aperture (8 round apertures each having a diameter of 0.35 mm, a rectangular aperture of 0.89 mm on a side, a round aperture having a diameter of 1 mm) were disposed at the position L=30 mm from the flow sensor 22, the flow rate and the output voltage were measured. As shown in FIG. 9, even if three kinds of perforated plate 15 were used, the output voltages of the flow sensor 22 showed the same tendency and showed the effect of reducing the influence of the pulsation. According to the experiment 5, it was clarified that if the total cross section area of the aperture/apertures of the perforated plate 15 was same, the effect of reducing the influence of the pulsation was not influenced by the number or shape of the aperture.

<Experiment 6>

Figure 10A:
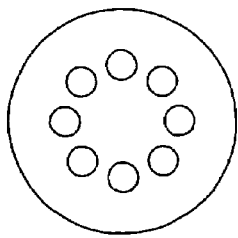
FIGS. 10a, 10b and 10c are front views of perforated plates used in a sixth experiment for confirming effects of the present invention.
Figure 10B:
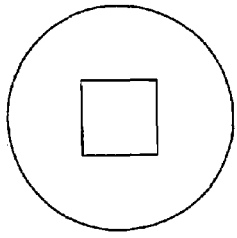
Figure 10C:
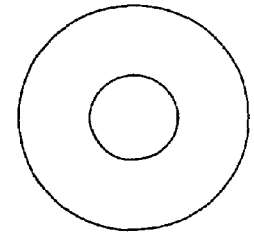
Figure 11:
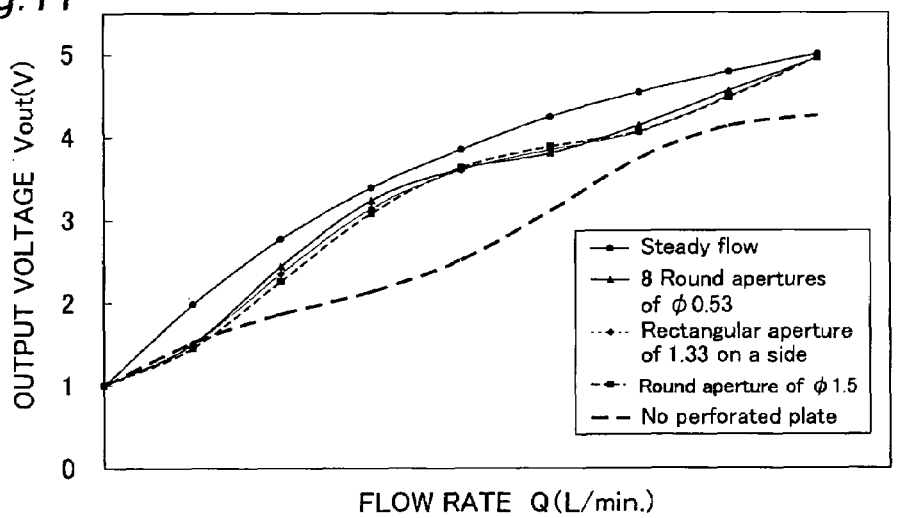
FIG. 11 is a graph of changes in output voltage to flow rate showing a result of sixth experiment.

The experiment 6 is same as the experiment 5 except changing the total cross section area of the perforated plate 15. That is to say, in the case that three kinds of the perforated plates 15 which as shown in FIGS. 10a to 10c had same thickness (t=0.8) and total cross section area (corresponding to diameter of 1.5 mm) but had different shape of aperture (8 round apertures each having a diameter of 0.53 mm, a rectangular aperture of 1.33 mm on a side, a round aperture having a diameter of 1.5 mm) were disposed at the position L=30 mm from the flow sensor 22, the flow rate and the output voltage were measured. As shown in FIG. 11, even if three kinds of perforated plate 15 were used, the output voltages of the flow sensor 22 showed the same tendency and showed the effect of reducing the influence of the pulsation. The effect of reducing the influence of the pulsation was smaller than that in the experiment 5. According to the experiments 5 and 6, it was clarified that if the total cross section area of the aperture/apertures of the perforated plate 15 was same, the effect of reducing the influence of the pulsation was not influenced by the number or shape of the aperture; and that the smaller the total cross section area was, the larger the effect of reducing the influence of the pulsation was.

<Experiment 7>

Figure 12A:
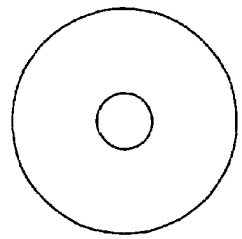
FIGS. 12a and 12b are front views and side view of perforated plates used in a seventh experiment for confirming effects of the present invention.
Figure 12B:
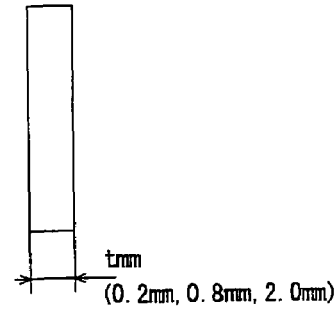
Figure 13:
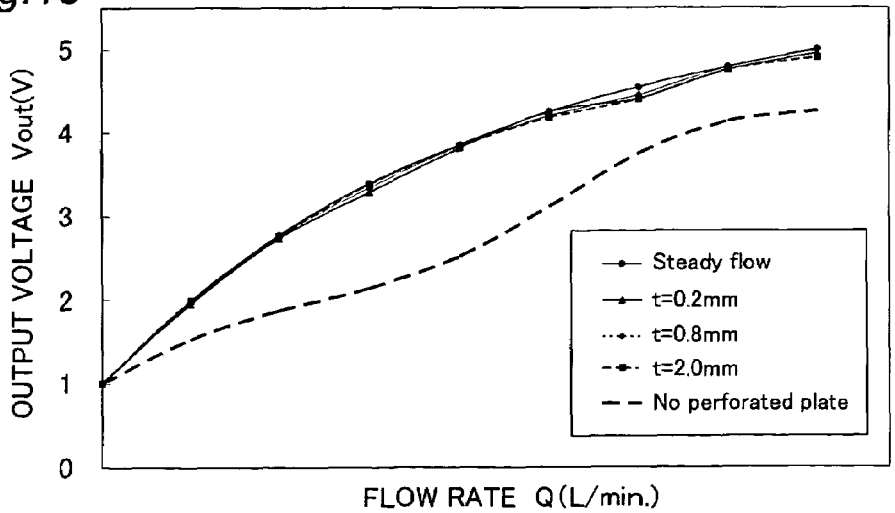
FIG. 13 is a graph of changes in output voltage to flow rate showing a result of seventh experiment.

In the experiment 7, in the case that three kinds of the perforated plates 15 which as shown in FIGS. 12a and 12b had same shape and dimension of aperture (round aperture and a diameter of 1 mm) but had different thickness (0.2 mm, 0.8 mm, 2.0 mm) were disposed at the position L=30 mm from the flow sensor 22, the flow rate and the output voltage were measured. As shown in FIG. 13, even if three kinds of perforated plate 15 each having different thickness were used, the output voltages of the flow sensor 22 showed the same tendency and showed the effect of reducing the influence of the pulsation. According to the experiment 7, it was clarified that if the shape and dimension of the aperture of the perforated plate 15 was same, the effect of reducing the influence of the pulsation was not influenced by the thickness.

Figures 14A, 14B, 14C, 14D:
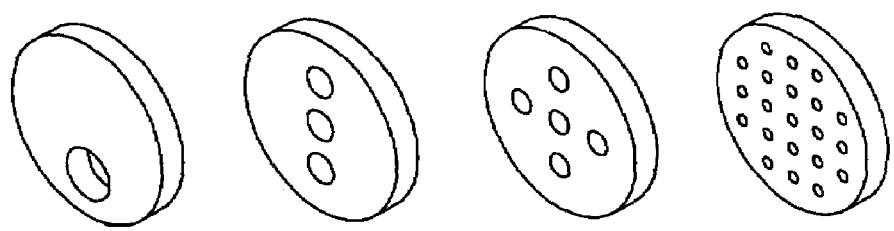
FIGS. 14a, 14b, 14c and 14d are perspective view showing other embodiments of the arrangements of apertures of the perforated plates.
Figures 15A, 15B, 15C:
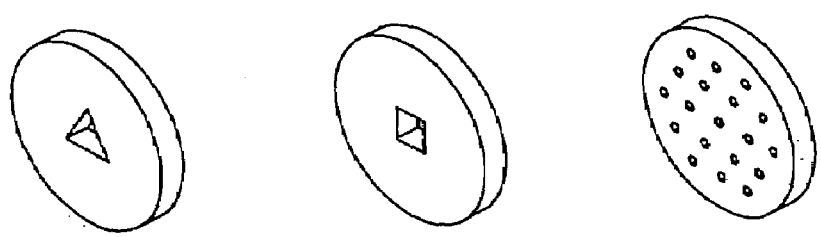
FIGS. 15a, 15b and 15c are perspective view showing other embodiments of the shapes of apertures of the perforated plates.
Figures 16A, 16B, 16C:
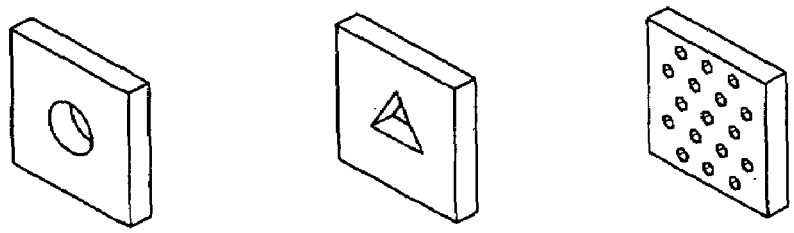
FIGS. 16a, 16b and 16c are perspective view showing other embodiments of the outer periphery, the shapes and arrangements of apertures of the perforated plates.

Although in the aforementioned embodiments the perforated plate 15 formed with one round aperture 17 at the center is used, one round aperture may be eccentric as shown in FIG. 14a, a plurality of round apertures may be formed as shown in FIGS. 14b and 14c, and a plurality of aperture disposed like a mesh as shown in FIG. 14d. The shape of the aperture 17 of the perforated plate 15 is not limited to a circle but may be a triangle, a quadrangle, and a plurality of hexagons disposed like a mesh as shown in FIGS. 15a to 15c. The shape of cross section of the main flow path portion may also limited to a circle but may be a quadrangle or any other shape as shown in FIGS. 16a to 16c.

Figures 17A, 17B:
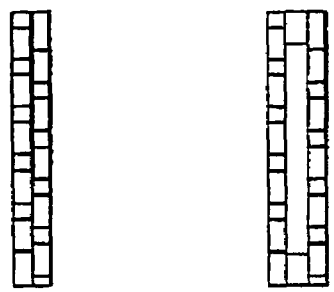
FIGS. 17a and 17b are sectional views showing other embodiments using two sets of the perforated plates.
Figures 18A, 18B, 18C, 18D:
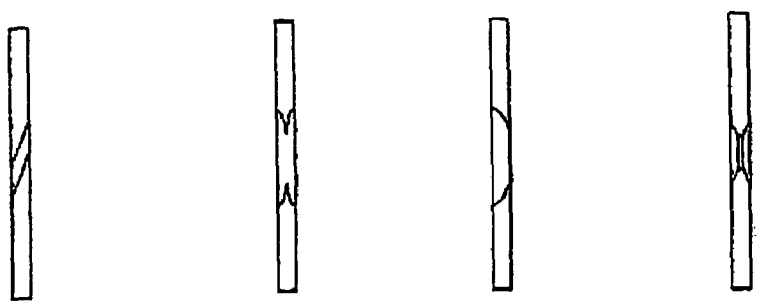
FIGS. 18a, 18b, 18c and 18d are sectional views showing other embodiments of the shapes of the sections in an axial direction of the perforated plates.
Figures 19A, 19B, 19C:
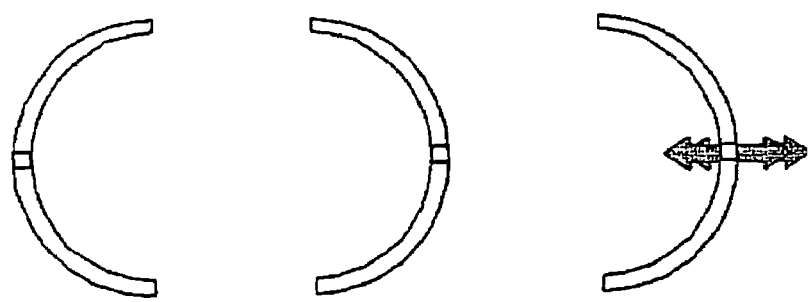
FIGS. 19a, 19b and 19c are sectional views showing other embodiments of the shapes of the surfaces of the perforated plates.
Figure 2:
Figure 2:
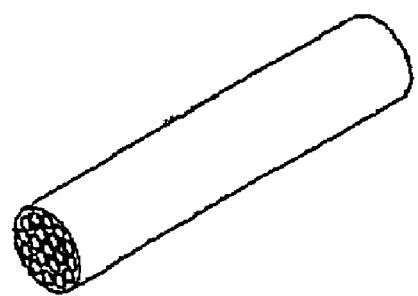

The perforated plate 15 is not limited to single plate but may be two superimposed plates as shown in FIG. 17a or two spaced plates via a spacer as shown in FIG. 17b. The shape of the cross section of the aperture 17 of the perforated plate 15 is not limited to a straight but may be an oblique with respect to the axial line of the flow 25 path as shown in FIG. 18a, a shape etched from both sides as shown in FIG. 18b, a shape etched from one side as shown in FIG. 18c, or a shape beveled from both sides or one side as shown in FIG. 18d. The shape of the surface of the perforated plate 15 is not limited to a plane but may be a sphere protruding toward the upstream side as shown in FIG. 19a or a sphere protruding toward the downstream side as shown in FIG. 19b. Also, the perforated plate 15 is not limited to plastic or metal having a rigidity but may use a material such as rubber or so having flexibility or elasticity that is possible to deform in a flow direction as shown in FIG. 19c.

The member having minimal cross-section flow path is not limited to a perforated plate 15 as in the above described embodiments but may use a foamed body such as sponge or so or a sintered body which has a plurality of non-linear continuous flow paths inside as shown in FIG. 20 or may use a member combined with a number of pipes as shown in FIG. 21.

As clear from above explanation, because the flow sensor is provided on the wall of the flow path in which the fluid to be measured and the member having minimal cross-section flow path is provided at the downstream side of the flow sensor, it is possible to suppress the turbulence of the flow rate in the cross section of the flow path and conduct high accurate and reliable flow measurement.

The invention claimed is:

1. A flow measurement device, comprising:
   a flow path in which a fluid is to be measured;
   a flow sensor provided on a wall surface of the flow path; and
   a member having a minimal cross-section flow path, the member being disposed downstream of the flow sensor, and having an opening ratio of less than 6.25%, wherein the opening ratio is a ratio of a total open area of the member to a total area of the member.

2. The flow measurement device as in claim 1, wherein the member having the minimal cross-section flow path is a perforated plate having an aperture as the minimal cross-section flow path.

3. The flow measurement device as in claim 1, wherein a mesh is disposed at an upstream side of the member having the minimal cross-section flow path.

4. The flow measurement device as in claim 2, wherein the aperture is eccentric with respect to a center of the flow path.

5. The flow measurement device as in claim 2, wherein the aperture comprises a plurality of apertures.

6. The flow measurement device as in claim 2, wherein the aperture comprises a plurality of apertures disposed like a mesh.

7. The flow measurement device as in claim 2, wherein the perforated plate comprises a plurality of plates.

8. The flow measurement device as in claim 7, wherein the plurality of plates are spaced by a specified distance.

9. The flow measurement device as in claim 2, wherein a shape of a cross section of the aperture in an axial direction is oblique with respect to an axial line of the flow path.

10. The flow measurement device as in claim 2, wherein the aperture is etched from both sides or one side.

11. The flow measurement device as in claim 2, wherein the aperture is beveled from both sides or one side.

12. The flow measurement device as in claim 2, wherein the perforated plate is a plane.

13. The flow measurement device as in claim 2, wherein the perforated plate is a sphere protruding toward an upstream side or a downstream side.

14. The flow measurement device as in claim 2, wherein the perforated plate is formed of a material having a flexibility or an elasticity, such that it is able to deform in a flow direction.

15. The flow measurement device as in claim 1, wherein the member having the minimal cross-section flow path is a foamed body or a sintered body which has a plurality of non-linear continuous flow paths inside.

16. The flow measurement device as in claim 1, wherein the member having the minimal cross-section flow path is a member combined with a number of pipes.

* * * * *